United States Patent Office 3,261,421
Patented July 19, 1966

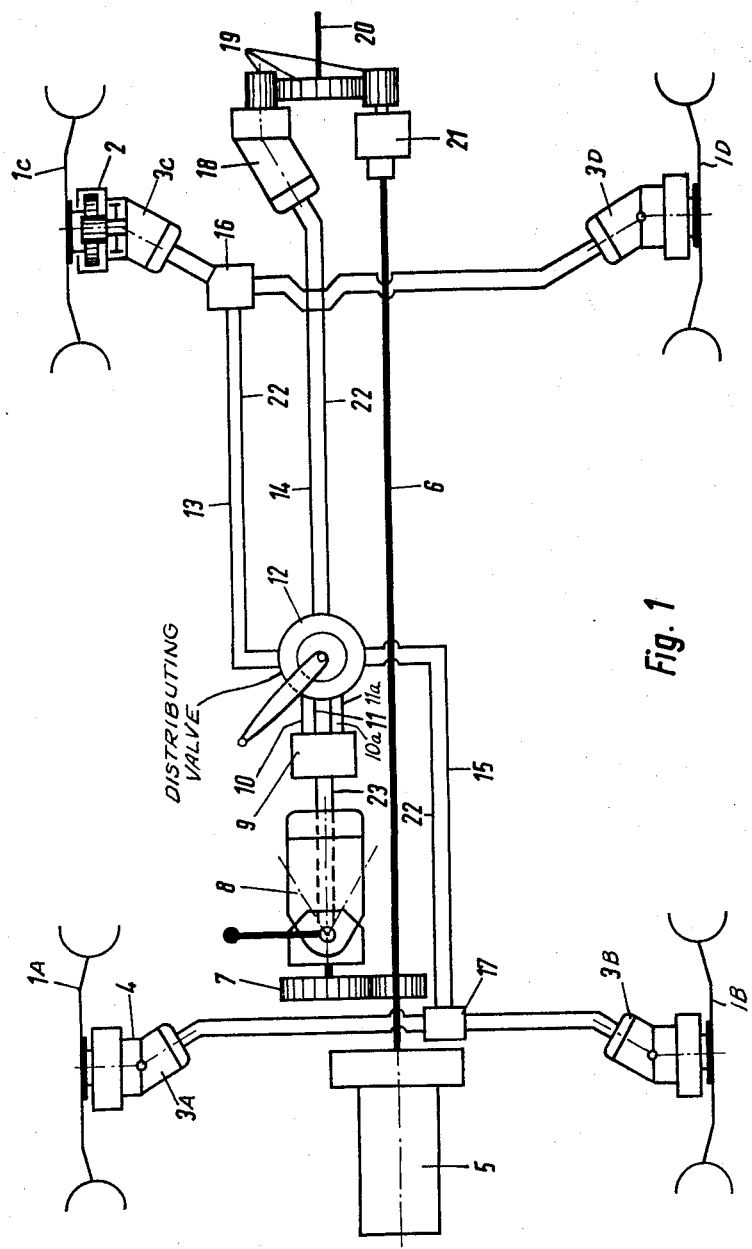

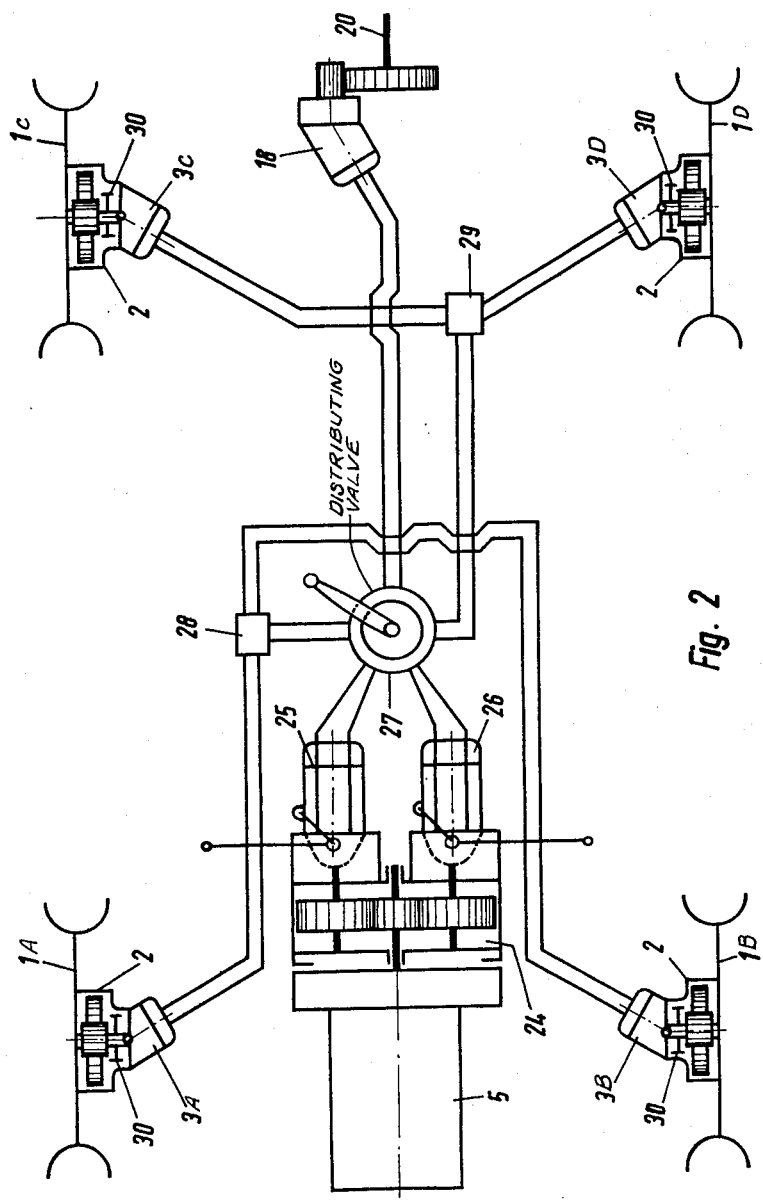

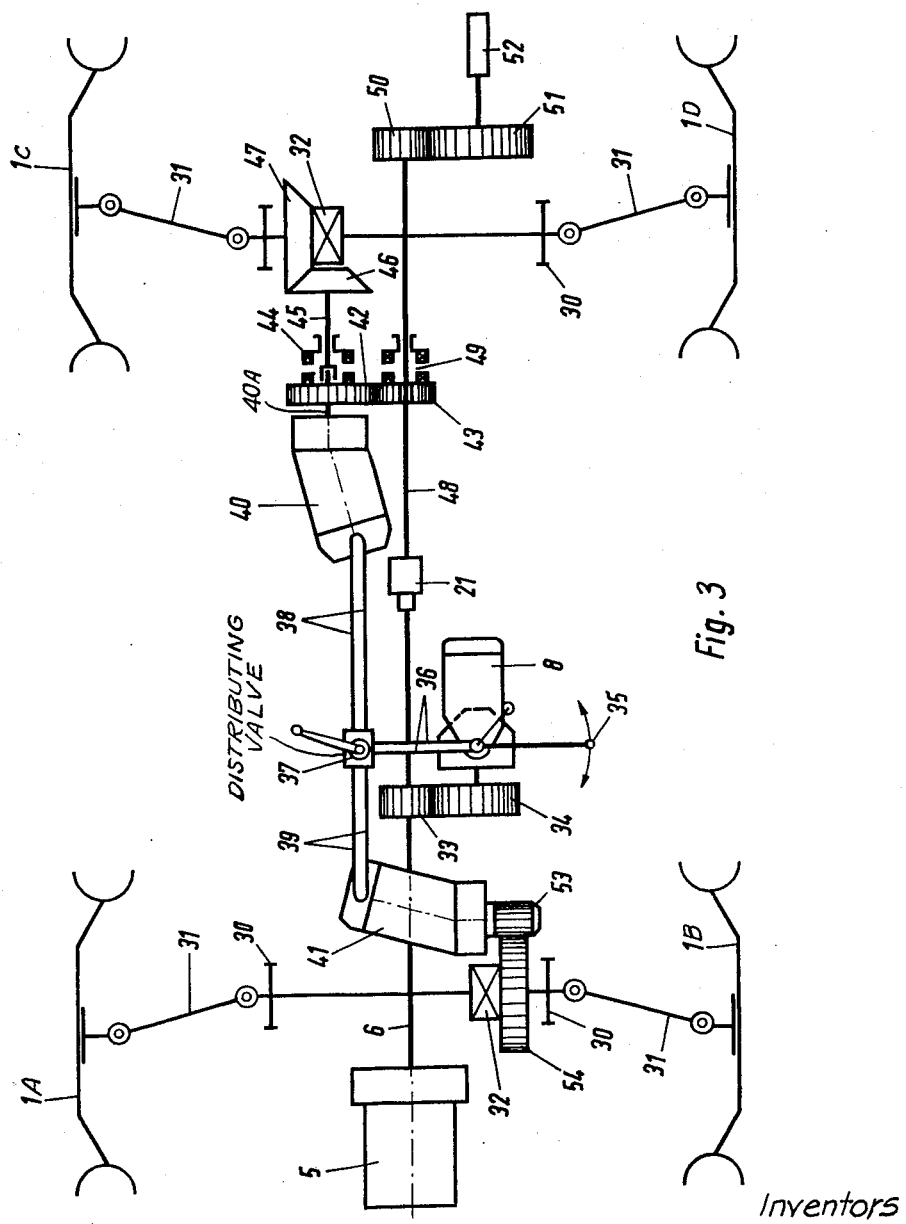

3,261,421
HYDRAULIC DRIVE FOR VEHICLES SELECTIVELY CONNECTABLE TO THE WHEELS AND POWER TAKE-OFF
Franz Forster, Glattbach, and Otmar Kaup, Aschaffenburg, Germany, assignors to Guldner-Motoren-Werke Aschaffenburg, branch of Gesellschaft fur Linde's Eismaschinen Aktiengesellschaft Wiesbaden, Aschaffenburg, Germany
Filed June 28, 1961, Ser. No. 120,252
Claims priority, application Germany, July 1, 1960, G 29,967; Aug. 6, 1960, G 30,242
1 Claim. (Cl. 180—53)

The present invention relates to a four-wheel drive hydraulic powered vehicle, more particularly, to such a vehicle having a wide range of speeds and power and having a hydraulic power system comprising at least one variable speed hydraulic pump and a plurality of variable speed hydraulic motors of which at least two motors power the wheels of the vehicle.

Four-wheel drive hydraulic powered motors have found particular application in agriculture, construction and in industry. A conventional hydraulic arrangement in such vehicles has been to mount at least two hydraulic motors for each of the wheels to be powered. These motors are then selectively either connected in series or in parallel and supplied with hydraulic fluid under pressure. When all motors are connected in series, approximately half of the pressure drop in the fluid occurs in each motor and accordingly the speed of the motors is high since the total quantity of hydraulic fluid passes through each of the motors.

When the two motors are connected in parallel, the total pressure of the hydraulic fluid acts on each motor so that the motors have a high power output.

This selectivity of the manner of connecting the motors between series and parallel is for the purpose of either driving the vehicle at a high speed and low traction power or at low speed and high traction power. Such a drive is, however, an expensive construction and, accordingly, the use of two hydraulic motors on each driven wheel is practical only for vehicles having very great traction power. This expensive form of construction is not warranted for vehicles used in agriculture and for lighter vehicles such as used in construction and industry.

Other arrangements of hydraulic motors have been proposed for such vehicles. When the hydraulic motors are connected in series, the pressure in the fluid supplied to each hydraulic motor varies, particularly when the latter of two series-connected motors will operate at a faster speed. This may establish a negative pressure in the pressure line between the two hydraulic motors. Differences in speeds may occur when each of the drive motors powers a respective wheel and the vehicle goes around a curve so that the outside wheel runs at a faster speed. While many devices have been proposed for compensating this reduction of pressure, such devices have not satisfactorily overcome the above-mentioned disadvantages.

It is therefore the principal object of this invention to provide a novel and improved hydraulic-powered, four-wheel-drive vehicle.

It is another object of this invention to produce a relatively inexpensive hydraulic-powered motor vehicle which can have selectively either a high speed or a high traction power with the speed being infinitely variable within a wide range but with a range of adjustment of the control valve only about one half the previously known adjustment range.

It is an additional object of this invention to provide a four-wheel drive vehicle powered by a plurality of hydraulic motors wherein each motor is alway supplied with the total pressure of the fluid from a hydraulic pump.

It is another object of this invention to provide an arrangement for a trailer towed by the hydraulic-powered vehicle and driven by a power take-off shaft on the vehicle wherein the hydraulic power delivered to the power take-off shaft is responsive to the force exerted on the connection between the vehicle and the trailer.

The present invention essentially comprises a vehicle having two axles and hydraulic drive motors or a hydraulic drive motor connected to each axle. A hydraulic control valve is provided to selectively connect either the drive motors of both axles or the drive motors of only one axle with a variable-speed hydraulic pump.

In one position of the control valve the full pressure of the hydraulic fluid is supplied to the drive motors of both axles of the vehicle. In this position the speed of the vehicle would be relatively low since the total quantity of hydraulic fluid under pressure is divided between the motors of the two axles.

In the other position of the control valve the hydraulic pressure delivered by the pump is admitted only to the motor or motors on one axle so that these motors would have a higher speed than in the previous position and the vehicle would be driven through only one axle.

Which of the axles is to be driven will depend upon the circumstances under which the vehicle is being used.

The vehicle of this invention can also be constructed so that each wheel is driven by an individual hydraulic motor. The hydraulic circuit is so arranged that the control valve may connect either all of the hydraulic motors or only the hydraulic motors on one axle to one or more variable-speed pump or pumps.

The vehicle may also be provided with two pumps which are driven by a common power plant such as an internal-combustion engine. It is thus possible by proper manipulation of the control valve to obtain the following valve connections:
 (a) Both pumps with the drive motors of one axle;
 (b) Both pumps with all of the drive motors;
 (c) One of the pumps with the drive motors of one axle; and
 (d) One of the pumps with all of the drive motors.

The greatest vehicle speed is therefore obtained when all of the pumps act upon the drive motors of one axle.

In addition, more than two pumps can be provided which pumps are driven by either one or more power plants.

In another modification of this invention the vehicle may comprise two hydraulic motors with each motor being connected to one of the axles. The drive shaft of one of the motors may be positioned parallel to the axle and connected thereto by suitable transmission gearing.

A differential gear arrangement may be provided between the transmission gears and the axles.

In addition to driving the wheels of the vehicle a power take-off shaft may also be driven by a hydraulic motor.

The vehicle may be so constructed that all four of the wheels can be steered. In such a construction the hydraulic drive motor for each wheel is so mounted as to pivot about a vertical axis together with the steering movement of the vehicle.

Other objects and advantages of this invention will be apparent upon reference to the following description when taken in conjunction with the accompanying drawing, wherein:

FIGURE 1 shows a schematic view of a vehicle of this invention with each of the wheels being driven by an individual hydraulic motor, there being an additional hydraulic motor for driving a power take-off shaft;

FIGURE 2 is a schematic view of a vehicle similar to that of FIGURE 1 but which comprises two variable-speed hydraulic pumps connected in parallel; and FIGURE 3 is a schematic view of another modification of this invention wherein the vehicle is provided with two hydraulic motors with each motor being drivingly connected to a respective axle.

In the drawing like reference symbols indicate the same parts throughout the various views, a specific embodiment and several modifications of this invention as shown.

In the embodiment of the invention as illustrated in FIGURE 1 there is schematically represented therein a vehicle having four wheels 1A, 1B, 1C, 1D. Each of the wheels is connected to a speed-reducing gear 2 which, in turn, is connected to a hydraulic drive motor 3. Each hydraulic motor and its respective speed-reducing gear are combined in a common casing which is pivotally mounted about a vertical axis 4 which is the axis about which the wheels 1 pivot when they are steered. A suitable hydraulic motor and its operation are described on pp. 398–401 of Servomechanism Practice, Ahrendt and Savant, McGraw-Hill, N.Y. 1960.

The vehicle further comprises an internal-combustion engine 5 which drives an output shaft 6 which has a gear transmission 7 driven thereby. A variable-speed hydraulic pump 8 is driven by the transmission 7. A suitable pump and its operation are described on pp. 396–398 of Servomechanism Practice (Supra).

A hydraulic fluid distributor 9 is connected behind the hydraulic pump 8 and connected by pressure supply lines 10 and 11 and return lines 10a and 11a, respectively, to a hydraulic control valve 12. The distributor 9 functions to equally distribute the quantity of hydraulic fluid pumped by the pump 8 connected to pressure lines 10 and 11. This arrangement ensures that when two or more hydraulic motors are connected to the hydraulic pump the motors will receive equal quantities of hydraulic fluid and hence each motor will exert an equal traction force.

The control valve 12 has hydraulic supply lines 13, 14 and 15 extending therefrom. The supply lines 13 and 15 are connected to hydraulic fluid distributors 16 and 17, respectively and the hydraulic supply line 14 is directly connected to a hydraulic motor 18.

The hydraulic motor 18 is connected through a reduction gear transmission 19 to an auxiliary power take-off shaft 20.

The engine output shaft 6 is also connected to the take-off shaft by a clutch 21 and the reduction gear 19. The hydraulic control valve 12 is so constructed that the following connections can be selectively made:

(a) The pressure line 10 can be connected with the supply line 13 and the pressure line 11 connected with the supply line 15;

(b) The pressure line 10 can be connected with the supply lines 13 and 15 and a pressure line 11 connected to the supply line 14;

(c) Both pressure lines 10, 11 can be connected to the supply line 15;

(d) The pressure line 10 can be connected with the supply line 15 and the pressure line 11 with the supply line 14.

In each one of the positions of the control valve corresponding to these connections the return conduits 22 are suitably connected with the second line 23 of the hydraulic pump 8.

In the event the pump is swung further than the zero position, the pressure lines will become supply or return lines and the return lines 22 and 23 will become supply lines. This will reverse the direction of rotation of the hydraulic motors.

The distributors 16 and 17 ensure an equal supply of hydraulic fluid to the drive motors 3 which are connected to each of the distributors 16 and 17.

When the pressure line 10 is connected to the supply lines 13 and 15 and the pressure line 11 is connected to the supply line 14, the quantity of hydraulic fluid discharged by the pump 8 is distributed to all of the drive motors 3 and 18. As a result, the rotary speed of the drive motor 18 will be equal to the rotary speed of the drive motors 3. In the event the drive motor 18 has a capacity different from that of the motor 3, the rotary speed of the drive motor 18 will be proportional to the rotary speed of the drive motors 3.

When all of the hydraulic fluid supplied by the pump 8 is admitted to all of the drive motors, the forward speed of the vehicle will be at a minimum. The travelling speed of the vehicle will be at its maximum when both of the supply lines 10 and 11 are connected with the supply line 15 so that the total output of the pump 8 is supplied to the drive motors 3A and 3B.

In this arrangement, the two drive motors 3C and 3D are shunted by the hydraulic circuit.

If, when the hydraulic circuit is so connected, the clutch 21 is engaged and the drive motor 18 is shunted, the auxiliary shaft will be directly driven by the engine 5 through the shaft 6. In this case the rotary speed of the take-off shaft 20 will be proportional to the engine shaft speed of the vehicle.

When the pressure line 10 is connected to both supply lines 13 and 15 the speed of the vehicle will be at a minimum. This speed is often required in agricultural arrangements. Since the hydraulic pumps are variable in speed, the speed ranges of the vehicle can follow each other from a minimum to a maximum without any interruption and without any steps due to switching from one connection to another.

In this arrangement of the embodiment of FIGURE 1 it is preferable to provide a hydraulic motor 18 for the power take-off shaft which is a variable-speed motor so that the ratio between the travelling speed of the vehicle and the rotary speed of the take-off shaft is infinitely variable.

Proceeding next to FIGURE 2 there is shown a modified vehicle wherein the internal-combustion engine 5 drives transmission gear 24 which, in turn, drives two variable speed hydraulic pumps 25 and 26. The pumps 25 and 26 are connected to hydraulic control valve 27 which, in turn, is connected to hydraulic fluid distributors 28 and 29 and to a power take-off drive motor 18. The distributor 28 is connected to the hydraulic motors 3A and 3B which are connected to the front wheels located near the engine 5.

The distributor 29 is similarly connected by supplying return lines to the hydraulic motors of the rear wheels 1C and 1D.

The control valve 27 has a plurality of positions which correspond to the valve connection of the hydraulic circuit:

(a) The pumps 25 and 26 are jointly connected to the distributor 28 and the vehicle is then driven only by the front wheels 1A and 1B and this connection will give a maximum speed of the vehicle;

(b) The two pumps 25 and 26 are connected to the distributors 28 and 29 so that all four of the hydraulic motors 3 are supplied with hydraulic fluid. In this connection the vehicle delivers its maximum traction at relatively high speed;

(c) The pump 25 is shunted or connected to the zero discharge position and the pump 26 is connected with the distributor 28. This connection results in a speed which is equal to that in connection (b) but the traction is less since only two wheels are being driven.

(d) The pump 25 is adjusted to the zero discharge position and the pump 26 is connected to both of the distributors 28 and 29 so that all four of the hydraulic motors are driven by a single pump 26. This connection produces a very slow vehicle speed.

(e) Both pumps 25 and 26 are connected to the hydraulic motor 18. Thus, the power take-off shaft 20 is driven at its maximum possible speed while the vehicle is stationary. This connection might be used, for example, to power an electric-current generator.

In addition to the above-described switching connections four further hydraulic connections are possible. In these four connections the hydraulic motor 18 is simultaneously supplied with hydraulic fluid. As a result, the rotary speed of the motor 18 will be proportional to the speed of the vehicle. Since, in most cases, the power take-off shaft is used at a relatively slow vehicle speed, accordingly, when the hydraulic motor 18 is being driven, the two hydraulic connections used most frequently is when one of the pumps is connected to either two or four of the hydraulic motors 3. When the pump 25 is connected with the distributor 28 and the pump 26 is connected with the distributor 29, it is not necessary to provide another distributor between the distributors 28 and 29, since the same discharges are supplied to the distributors 28 and 29 by the two pumps. This is provided that the pumps are adjusted so as to discharge equal quantities of fluid.

A brake 30 may be provided on each of the wheels 1.

Proceeding next to FIGURE 3 there is shown a still further modification of the vehicle of this invention. In this modification the transmission gearing comprises a gear 33 which is mounted on the output shaft 6 which is in mesh with a gear 34 which drives the hydraulic pump 8. A lever 35 extends outwardly from the pump 8 so as to pivot the pump 8 between several positions. (See the pump of our earlier-filed commonly assigned Patent No. 3,107,491 of October 22, 1963.)

Two fluid supply lines 36 extend from the pump 8 to a hydraulic control valve 37. Hydraulic supply lines 38 and 39 extend from the control valve 37 to be connected to hydraulic motors 40 and 41, respectively.

A gear 42 is mounted on the output shaft 40A of the hydraulic motor 40 and meshes with a gear 43. The gear 42 can be drivingly connected by means of a clutch 44 with a shaft 45 on which is mounted a bevel gear 46. The bevel gear 46 meshes with a second bevel gear 47, which is drivingly connected through a mechanical differential gear 32 to the axles 31. Brakes 30 are also positioned for each of the wheels 1.

The gear 43 is rotatably mounted on a shaft 48 and can be drivingly connected thereto by means of a clutch 49. Shaft 48 can be connected with the output shaft 6 by the clutch 21.

A gear 50 is mounted on the end of the shaft 48 and meshes with a gear 51 which is drivingly connected to an auxiliary power take-off shaft 52.

The hydraulic motor 41 has a pinion gear 53 mounted on its output shaft which is parallel to the forward axle of the vehicle. The pinion 53 meshes with a gear 54 which, through a differential gear 32, is connected to the axles 31.

The control valve 37 can be adjusted into such a position that the two hydraulic motors 40 and 41 are equally supplied with hydraulic fluid under pressure from the pump 8. In this connection, should the clutch 21 be engaged and the clutch 49 be disengaged, the power take-off shaft 52 can be driven at a speed which is dependent upon the speed of the internal combustion engine 5.

The speed of the shaft 52 will be maintained for the travelling speed of the vehicle. The speed of the vehicle will depend on the position of the pump 8 as adjusted by the lever 35.

In the event that the clutch 21 is disengaged and the clutch 49 is engaged, the power take-off shaft 52 will be driven at a speed which is proportional to the speed of the shaft 45. In this position of the control valve the hydraulic fluid supplied by the pump 8 is equally distributed to the hydraulic motors 40 and 31 and both of these motors are supplied with the full discharge pressure of the pump.

The control valve 37 can be adjusted to such a position that the pump 8 is connected only with the hydraulic motor 41. Accordingly, the motor 41 will receive the total quantity of hydraulic fluid discharged by the pump 8 and will accordingly run at a relatively high speed. The vehicle can travel at a correspondingly relatively high ground speed. In this position of the control valve with the clutch 49 disengaged and the clutch 21 engaged, the power take-off shaft 52 will be driven at a speed dependent upon the speed of the engine 5.

In the same position of the control valve 37, however, it is possible to disengage the clutch 21 to engage the clutches 44 and 49 and the hydraulic motor 40 will be shunted. Under these circumstances the gears 42 and 43 are driven by the shaft 45 and the power take-off shaft 52 will be driven by the shaft 48 merely by the movement of the rear wheels over the ground since the hydraulic motor 40 is shunted. The power take-off shaft 52 will then be driven at a speed which depends on the speed of the vehicle.

The control valve 37 may be switched to a position so that only the hydraulic motor 40 is supplied by the variable speed pump 8. If in this position the clutch 44 is disengaged and the clutch 49 is engaged, the power take-off shaft 52 will be driven by the hydraulic motor 40 at a speed which may be selectively varied. This will be true even when the vehicle is in the idle position.

Should the pump 8 be adjusted to a zero discharge position (the pump thus being of variable-capacity type) and the clutch 21 engaged and the clutch 49 disengaged, the power take-off shaft 52 can be driven at a speed which is a function of the speed of the engine 5. This will also be true while the vehicle is stationary but the engine 5 is being operated.

It is therefore apparent that the modification of FIGURE 3 provides a wide range of switching arrangements which can be achieved at a relatively low cost and hence considerable operating advantages may be derived from such a vehicle.

It is apparent that while it has been previously thought necessary to provide a hydraulic motor for each wheel of a vehicle having a four-wheel drive, the present invention discloses a four-wheel drive vehicle wherein only two hydraulic motors are used. In this arrangement one hydraulic motor acts upon each shaft axle with two of the wheels being mounted on each axle. The control valve acts through a variable speed hydraulic pump either on both or on one of the hydraulic motors so that when only one motor is connected to the pump the other motor will be short-circuited to provide a minimum resistance when these wheels are rolling over the ground.

It will be understood that this invention is susceptible to modification in order to adapt it to different usages and conditions and, accordingly, it is desired to comprehend such modifications within this invention as may fall within the scope of the appended claim.

What is claimed as this invention is:

A four-wheel drive vehicle comprising:
(a) a vehicle chassis having first and second axles each provided with a pair of respective wheels;
(b) two hydraulic motors each operatively connected with a respective one of said axles for driving the wheels thereof;
(c) an internal-combustion engine on said chassis having an output shaft;
(d) a variable-capacity hydraulic pump operatively connected to said shaft;
(e) conduit means for connecting said pump with said motors for transmitting fluid displaced by said pump to said motors;
(f) a power-take-off shaft on said chassis;
(g) first clutch means operatively connecting said power-take-off shaft to said output shaft for operating said power-take-off shaft at a speed determined directly by the speed of said output shaft;
(h) second clutch means for operatively connecting one of said hydraulic motors with said power-take-off shaft for driving same at a speed determined by said one of said hydraulic motors;

(i) third clutch means interposed between said one of said hydraulic motors and the respective one of said axles for selectively coupling and decoupling said one of said hydraulic motors with respect to said one of said axles; and
(j) control means between said pump and said motors for selectively connecting each of said motors and both of said motors to said pump for individual and joint operation selectively of said motors.

References Cited by the Examiner

UNITED STATES PATENTS

| | | | |
|---|---|---|---|
| 936,595 | 10/1909 | Alperin | 180—45 |
| 957,075 | 5/1910 | Masters | 180—45 |
| 2,558,562 | 6/1951 | Hutton | 180—45 |
| 2,626,001 | 1/1953 | Antle | 180—66 |
| 2,936,035 | 5/1960 | Hill | 180—44 |
| 2,996,135 | 8/1961 | Grabow | 180—44 |
| 3,061,032 | 10/1962 | Ritter et al. | 180—53 |

FOREIGN PATENTS 219,478  7/1957  Australia.

A. HARRY LEVY, *Primary Examiner.*

PHILIP ARNOLD, *Examiner.*